(12) United States Patent
Tano et al.

(10) Patent No.: US 7,079,927 B1
(45) Date of Patent: Jul. 18, 2006

(54) METHOD FOR ANALYZING TENDENCY OF OPERATION OF MOVING OBJECT, OPERATION CONTROL SYSTEM AND ITS CONSTITUENT APPARATUS, AND RECORDED MEDIUM

(75) Inventors: Michiyasu Tano, Tokyo (JP); Tsutomu Miyasaka, Tokyo (JP); Kohei Tojo, Tokyo (JP); Hiroki Satake, Tokyo (JP); Reiko Umeda, Tokyo (JP)

(73) Assignee: Data Tec Co., Ltd., Tokyo (JP)

( * ) Notice: Subject to any disclaimer, the term of this patent is extended or adjusted under 35 U.S.C. 154(b) by 0 days.

(21) Appl. No.: 09/857,861

(22) PCT Filed: Nov. 30, 1999

(86) PCT No.: PCT/JP99/06684

§ 371 (c)(1),
(2), (4) Date: Jun. 11, 2001

(87) PCT Pub. No.: WO01/27562

PCT Pub. Date: Apr. 19, 2001

(30) Foreign Application Priority Data

Oct. 12, 1999 (JP) .................................... 11-290354

(51) Int. Cl.
*G06F 19/00* (2006.01)

(52) U.S. Cl. .................. 701/35; 701/36; 701/25
(58) Field of Classification Search .............. 701/35, 701/36, 25, 29; 340/870.03, 439, 576
See application file for complete search history.

(56) References Cited

U.S. PATENT DOCUMENTS

| | | | |
|---|---|---|---|
| 4,611,199 A | 9/1986 | Seko et al. | |
| 5,465,079 A * | 11/1995 | Bouchard et al. | 340/576 |
| 5,570,087 A * | 10/1996 | Lemelson | 340/870.05 |
| 5,638,273 A | 6/1997 | Coiner et al. | 701/35 |
| 5,805,079 A | 9/1998 | Lemelson | 340/870.05 |
| 5,809,437 A | 9/1998 | Breed | |
| 5,821,860 A * | 10/1998 | Yokoyama et al. | 340/576 |
| 5,842,754 A | 12/1998 | Sano | |
| 5,893,896 A | 4/1999 | Imamura et al. | |
| 6,092,005 A * | 7/2000 | Okada | 701/1 |
| 6,198,996 B1 * | 3/2001 | Berstis | 701/36 |
| 6,311,114 B1 * | 10/2001 | Graf et al. | 701/57 |

FOREIGN PATENT DOCUMENTS

| | | |
|---|---|---|
| JP | 7-277230 | 10/1995 |
| JP | 11-125534 | 5/1999 |

* cited by examiner

*Primary Examiner*—Thomas G. Black
*Assistant Examiner*—Christine M. Behncke
(74) *Attorney, Agent, or Firm*—Jordan and Hamburg LLP

(57) ABSTRACT

An operation management system includes a sensor section for detecting behavior of a vehicle, a recorder section for recording the behavior detected by the sensor section on a memory card, and a behavior analyzer for setting a condition pattern for determining the behavior of vehicle as dangerous behavior. The recorder section compares a condition pattern for recognizing the behavior of a vehicle as dangerous behavior with the behavior actually detected by the sensor section, and records only information relating to behavior compatible with the condition pattern on the memory card by dangerous behavior, and statistically analyzes it using the behavior analyzer.

16 Claims, 12 Drawing Sheets

FIG.5

| INITIAL SETTING | | |
|---|---|---|
| KIND OF VEHICLE | DATA TECH | |
| DRIVER | ONO  OHO | |
| VEHICLE VELOCITY PULSE SCALE FACTOR | 400 | mm |
| COLLECTING INTERVAL | 30 | SECONDS |
| DRIVING DISTANCE AT COLLECTING INTERVAL | 520 | cm |
| EVENT RECORDING TIME FORWARD | 30 | SECONDS |
| BACKWARD | 30 | SECONDS |
| THE MAXIMUM NUMBER OF TIMES OF EVENTS | 255 | TIMES |

FIG.6

CHARACTERISTIC BEHAVIOR

SUDDEN ACCELERATION
SUDDEN ACCELERATION OF 0.35 G OR MORE FROM STOP STATE

TURN AT INTERSECTION
RANGE FROM 60° TO 100°

FIG.14
| | VALUE OF ACCELERATION | ANGULAR VELOCITY | STOP | RISE |
|---|---|---|---|---|
| NORMAL CURVE OPERATION | ABOUT 0.2G | 20° /SEC, TURN CURVE AT 4.5 SEC. | COMPLETELY STOP | ACCELERATION IS GENTLY GENERATED |
| UNREASONABLE CURVE OPERATION | ACCELERATION OF 0.3G OR MORE | 30° /SEC, TURN CURVE WITHIN 3 SEC | ACCELERATION IS GENERATED AND NO COMPLETE STOP OCCURS | HIGH ACCELERATION IS SUDDEN GENERATED |
FIG.15
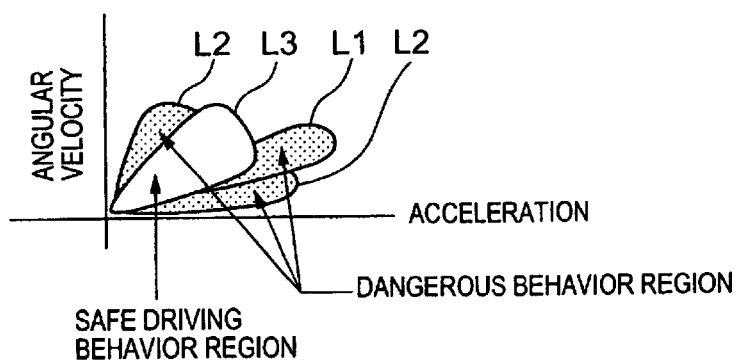
FIG.16
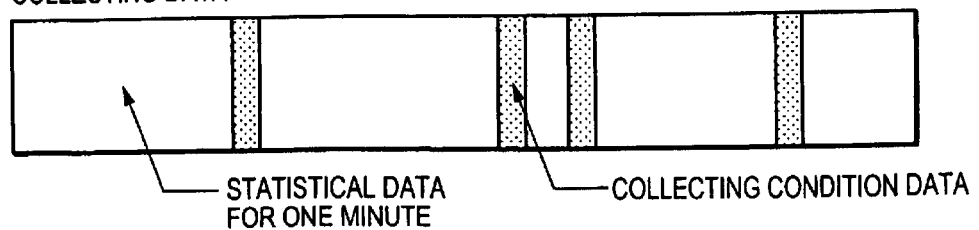

FIG.17

| COLLECTING DATA | EXPLANATION |
|---|---|
| MAXIMUM VELOCITY | MAXIMUM VELOCITY IS STORED AMONG VELOCITY FOR ONE MINUTE. THE CHARACTERISTIC OF DRIVER'S BEHAVIOR IS EXPRESSED BY MAXIMUM DATA. |
| AVERAGE VELOCITY | AVERAGE IS COLLECTED AS COMPARISON OF MAXIMUM VELOCITY |
| PLUS MAXIMUM ACCELERATION (FOR ANALYZING ACCELERATION) | MAXIMUM ACCELERATION IS COLLECTED WITHOUT BEING LIMITED TO THE PATTERN OF DRIVER'S DRIVING BEHAVIOR. |
| MINUS MAXIMUM ACCELERATION (FOR ANALYZING ACCELERATION) | THE SAME |
| PLUS MAXIMUM ANGULAR VELOCITY (FOR ANALYZING TURN BY STEERING TO RIGHT) | MAXIMUM TURN STEERING OPERATION IS COLLECTED WITHOUT BEING LIMITED TO THE CURVE DRIVING. |
| MINUS MAXIMUM ANGULAR VELOCITY (FOR ANALYZING TURN BY STEERING TO LEFT) | THE SAME |
| PLUS MAXIMUM LATERAL ACCELERATION (ACCELERATION WHEN TURNING BY STEERING TO RIGHT) | CENTRIFUGAL FORCE WHEN TURNING, ROLL ANGLE (DETECTION OF ROLLOVER IN CASE OF OVERLOAD) |
| MINUS MAXIMUM LATERAL ACCELERATION (ACCELERATION WHEN TURNING BY STEERING TO LEFT) | THE SAME |
| POSITION AND TIME USING GPS | HISTORY AND TIME OF OPERATION PATH BASED ON POSITION AND TIME EVERY ONE MINUTE |

FIG.18

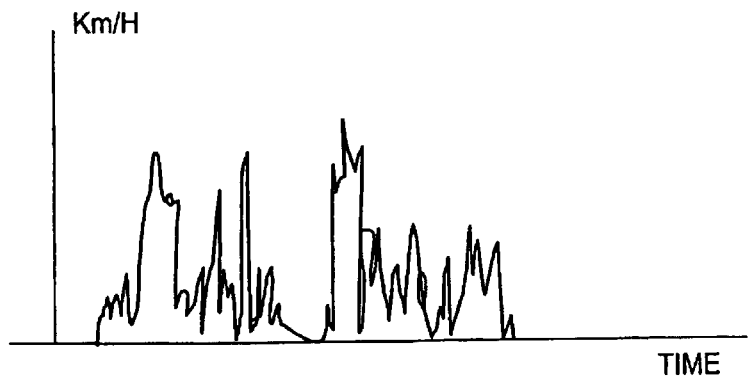

FIG.22

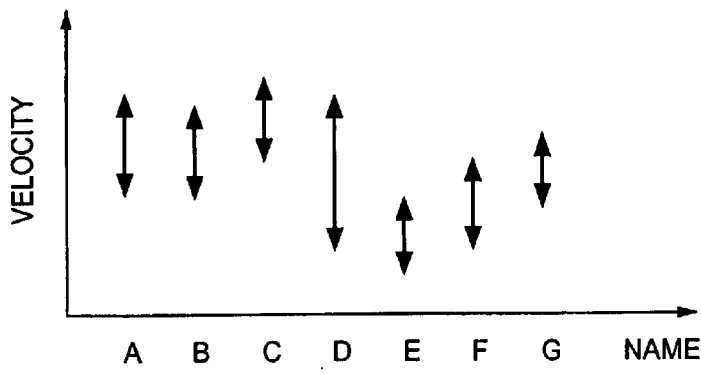

FIG.23

| RELATIONSHIP OF SIGNAL | MAXIMUM ANGULAR VELOCITY – ACCELERATION | MAXIMUM ACCELERATION – ANGULAR VELOCITY | MAXIMUM ACCELERATION – VELOCITY | MAXIMUM LATERAL ACCELERATION – DEGREE / ANGULAR VELOCITY |
|---|---|---|---|---|
| MEASURING DEVICE | ACCELEROMETER – GYROSCOPE | ACCELEROMETER – GYROSCOPE | VEHICLE PULSE – ACCELEROMETER | GYROSCOPE – ACCELEROMETER |
| EXPLANATION | ① DRIVING PATTERN AT CURVE ② STOP PATTERN AT CURVE ③ START WITH TURNING ④ STOP WITH TURNING | THE RELATIONSHIP OF ACCELERATION WHEN THE MAXIMUM ANGULAR VELOCITY OCCURS, NAMELY, THE VALUES OF THE COMPLEX ACCELERATION AND BRAKING WHILE TURNING ARE ESTIMATED. | EVEN IF THE ACCELERATION GENERATED BY THE SAME BRAKING IS USED, -0.1G WHERE THE ACCELERATION IS 10 KM AND -0.1G WHERE THE ACCELERATION IS 100 KM ARE DIFFERENT FROM EACH OTHER. ACCORDINGLY, THE DEGREE OF DANGER IS DIFFERENT DEPENDING ON THE VELOCITY EVEN IF THE SAME BRAKING OPERATION IS PERFORMED. | CENTRIFUGAL FORCE = VELOCITY × ANGULAR VELOCITY IN THE NORMAL DRIVING, CENTRIFUGAL FORCE ≒ LATERAL ACCELERATION IS ESTABLISHED. HOWEVER, IF A SLIP OR ROLL OCCURS BEYOND THE DRIVING LIMIT, CENTRIFUGAL FORCE ≠ LATERAL ACCELERATION IS ESTABLISHED. THE DEGREE OF DANGER IS DETERMINED BASED ON THE VALUE OF THE DIFFERENCE. |

METHOD FOR ANALYZING TENDENCY OF OPERATION OF MOVING OBJECT, OPERATION CONTROL SYSTEM AND ITS CONSTITUENT APPARATUS, AND RECORDED MEDIUM

DESCRIPTION

Method for analyzing operation tendency of mobile object, operation management system and its structural apparatus, and storage medium

TECHNICAL FIELD

The present invention relates to a management system of operation data indicative of behavior of a mobile object such as vehicle, rail car and the like. The present invention particularly relates to a data recorder suitable for analyzing an operation tendency that a driver has and an operation managing system using the same.

BACKGROUND ART

There is an operation management system having a data recorder that records measured data of the behavior of vehicles and other mobile objects and a behavior analyzer that performs analysis of the measured data recorded on the data recorder. In such an operation management system, the data recorder, which detects measured data of behavior of vehicles and records data, is also referred to as a safety recorder and comprises a sensor section including an angular velocity meter, an accelerometer, a GPS (Global Positioning System) receiver, and a recorder section for recording measured data detected by the sensor section. Measured data specifically includes angular velocity data including at least data on roll, pitch, and yaw, and acceleration data of any one of first to three dimensions, GPS data indicative of latitude, longitude, velocity and direction.

Measured data recorded on the recorder is collected and analyzed by a behavior analyzer. The behavior analyzer can be implemented by a computer. In the behavior analyzer, among measured data, turn angular velocity is obtained from angular velocity data, start acceleration and brake acceleration are obtained from acceleration data, and a current position of vehicle, time, and driving velocity are obtained from GPS data.

In conventional systems, one data recorder is fixed to a target vehicle. Also, measured data is recorded regardless of who is a driver. In the case of an occurrence of an accident, the conventional data recorder analyzes the behavior of the vehicle ex post facto to investigate the cause of the accident. This extremely restricts the range of use of such systems and causes difficulty in the widespread use of such systems by ordinary drivers.

In conventional, all measured data generated in the behavior of vehicle is recorded. For this reason, the data recorder is required to reserve enormously large area for recording within a given time period in order to repeat the recording. The analyzer is required to execute heavy processing in order to discriminate measured data recorded.

Moreover, in the conventional operation management system, there is no viewpoint in which the driver's tendency in the operation is grasped to generate information for preventing occurrence of accidents.

For example, in the case of automobiles, about 70 percent of the traffic accidents occur at locations such as an intersection and like where the complex operations are required to the drivers. At such a location, as a driving operation, the operation of steering wheel is required in addition to the operations of accelerator and brake. In conventional, there have not been made sufficient schemes to increase recognition of danger with respect to the driving operation at the locations where the incidence of traffic accidents is high.

DISCLOSURE OF INVENTION

A first object of the present invention is to provide a mobile object operation tendency analyzing technique that is capable of grasping the operation tendency of the mobile object such as a vehicle. A second object of the present invention is to provide a mobile object operation tendency analyzing method, a mobile object operation management system that is suitable for executing this method, a data recorder, a behavior analyzer, and a storage medium, which is suitable for executing processing for the operation tendency analysis on a computer.

According to a first aspect of the present invention, there is provided an operation management system for a mobile object comprising: a data recorder including means for detecting behavior of a mobile object that satisfies a complex collecting condition in accordance with mobile object operation factors different from each other before and after occurrence of the behavior on the time series, and means for recording the detected behavior on a predetermined storage medium; and condition setting means for setting the collecting condition, wherein the data recorder records only information relating to behavior compatible with the collecting condition set by the condition setting means on the storage medium according to the behavior.

As one mode for carrying out the invention, the data recorder includes means for intermittently recording information relating to behavior that does not satisfy the collecting condition, and the data recorder records the information intermittently recorded on the storage medium as distinguished from information relating to behavior compatible with the collecting condition.

The condition setting means sets the collecting condition in accordance with at least one of identification information of an operator of the mobile object, behavioral environment of the mobile object, and a behavioral history of the operator.

The storage medium is, for example, a card-like storage medium that is classified in accordance with at least one of identification information of the mobile object, identification information of an operator that operates the mobile object, and behavioral environment of the mobile object, and that is generated on a classification-by-classification basis.

According to a second aspect of the present invention, there is provided an operation management system for a mobile object comprising means for detecting behavior of a mobile object before and after occurrence of the behavior on the time series when the behavior of the mobile object satisfies a predetermined collecting condition, and for intermittently detecting the behavior of the mobile object when the behavior of the mobile object dissatisfies the collecting condition; means for recording information relating to the behavior detected on the time series and information relating to the behavior intermittently detected on a predetermined storage medium as distinguished from each other; and means for reproducing operation circumstances of the corresponding mobile object based on each information recorded on the storage medium.

According to a third aspect of the present invention, there is provided a data recorder comprising: a sensor section for detecting behavior of a mobile object on the time series; and recording means for determining the presence or absence of occurrence of a specific behavior in the behavior of the corresponding mobile object detected by the sensor section in accordance with a complex behavioral condition, which is a behavioral condition for determining the behavior as the specific behavior and which conforms to mobile object operation factors different from each other, and for recording information relating to the specific behavior of the corresponding mobile object in accordance with occurrence of the specific behavior on a predetermined storage medium.

The specific behavior is dangerous behavior, and the recording means may determine the presence or absence of occurrence of the dangerous behavior based on compatibility between a condition pattern that fixes the corresponding dangerous behavior and the behavior pattern detected by the sensor section, and the recording means may record information of the corresponding behavior when the dangerous behavior occurs.

The recording means may intermittently record information relating to the behavior of the corresponding mobile object on the storage medium as distinguished from information relating to the specific behavior when no specific behavior occurs.

The storage medium is a card-like storage medium that is classified in accordance with at least one of identification information of the mobile object, identification information of an operator of the mobile object, and behavioral environment of the mobile object, and that is generated on a classification-by-classification basis, and at least the behavioral condition may be recorded on the card-like storage medium.

According to a fourth aspect of the present invention, there is provided a behavior analyzer for a mobile object comprising: condition setting means for setting a complex collecting condition which is a collecting condition for collecting information relating to a specific behavior of the mobile object and which is based on mobile object operation factors different from each other on a predetermined storage medium; and analyzing means for reading recorded information from the storage medium on which information relating to behavior of the mobile object compatible with the set collecting condition is recorded to analyze the behavioral content of the corresponding mobile object from the read information.

The analyzing means reads information, which is different from information relating to the specific behavior and which is intermittently recorded according to behavior other than the specific behavior, from the storage medium, and analyzes the behavioral content of the corresponding mobile object in accordance with information.

According to a fifth aspect of the present invention, there is provided a behavior analyzer for a mobile object comprising: collecting condition setting means for setting a complex collecting condition which is a collecting condition for collecting information relating to a specific behavior of the mobile object and which is based on mobile object operation factors different from each other on a predetermined storage medium; and analyzing means for reading the information from a predetermined storage medium on which information relating to the specific behavior of the mobile object is recorded to compare the read information with a condition pattern for specifying a predetermined behavioral pattern and to analyze the behavioral content of the corresponding mobile object.

According to a sixth aspect of the present invention, there is provided a computer-readable storage medium having digital information recorded thereon, the digital information is causing a computer to execute procedures for setting a complex collecting condition, which is a collecting condition for collecting information relating to a specific behavior of the mobile object and which is based on mobile object operation factors different from each other, on a predetermined storage medium; reading recorded information from the storage medium on which information relating to behavior compatible with the set collecting condition is recorded; and analyzing the behavioral content of the corresponding mobile object from the read information.

According to a seventh aspect of the present invention, there is provided a computer-readable storage medium having digital information recorded thereon, the digital information is causing a computer to execute procedures for setting a first collecting condition for collecting information relating to specific behavior of a mobile object and a second collecting condition for collecting information relating to normal behavior other than the specific behavior on a predetermined storage medium; reading recorded information by behavior from the storage medium on which information relating to behavior compatible with the first and second collecting conditions is recorded as distinguished from each other; and analyzing the behavioral content of the corresponding mobile object from the read information.

According to an eighth aspect of the present invention, there is provided an operation tendency analyzing method for a mobile object comprising: the first step of determining the presence or absence of occurrence of specific behavior in behavior of the corresponding mobile object actually detected in accordance with behavioral conditions showing the specific behavior of the mobile object; the second step of recording information relating to the specific behavior of the corresponding mobile object on a predetermined storage medium in accordance with occurrence of the specific behavior; and the third step of analyzing an operation tendency of the corresponding mobile object based on information recorded on the storage medium.

The second step includes the sub-step of recording information relating to the specific behavior before and after occurrence of the corresponding behavior on the storage medium on the time series and intermittently recording information relating to the behavior of the mobile object on the storage medium when no the specific behavior occurs, and the third step includes the sub-step of analyzing a complex operation tendency of the corresponding mobile object based on the recorded information. Also, the third step includes the sub-step of obtaining a statistical operation tendency from information recorded on the storage medium intermittently, obtaining a difference between the statistical operation tendency and information recorded on the storage medium on the time series, and analyzing a complex operation tendency of the corresponding mobile object in accordance with the difference. In addition, the third step may include the sub-step of analyzing the operation tendency based on condition information set in accordance with at least one of identification information of an operator of the mobile object, behavioral environment of the mobile object, and behavioral history of the operator. Or, the third step includes the sub-step of analyzing the operation tendency based on complex condition information set in accordance with a plurality of mobile object operation factors different from each other.

BRIEF DESCRIPTION OF THE DRAWINGS

FIG. 5 is an explanatory view showing one example of an initial information setting page;

FIG. 6 is an explanatory view showing one example of a characteristic behavior setting page;

FIG. 12A and FIG. 12B are combined and a graph (chain line) of FIG. 11 are overlaid on each other;

FIG. 14 is a table showing a comparison between the case (normal curve operation) in which unreasonable driving behavior does not occur and the case (abnormal curve operation) in which unreasonable driving behavior occurs by a plurality of items;

FIG. 15 is a combination view of a synthetograph, which schematically shows angular velocity and acceleration in the case of cornering after sudden acceleration in the behavior of the right turn operation, a synthetograph, which schematically shows angular velocity and acceleration in the case of sudden acceleration after hard cornering in the same behavior, and a synthetograph, which schematically shows angular velocity and acceleration of the normal operation in the same behavior;

FIG. 16 is a view illustrating the structure of data example collected according to a modification of the present invention;

FIG. 17 is a table explaining the content of data example collected according to a modification of the present invention;

FIG. 18 is an example of the analytical result of data collected according to a modification of the present invention, namely a graph illustrating the analysis of the maximum velocity for one day;

FIG. 22 is an example of the analytical result of data collected according to a modification of the present invention, namely a view illustrating an average maximum velocity for one month and a standard deviation (1 σ) by individual;

FIG. 23 is a table showing combinations of data collected, measuring devices for use in measuring data and the contents of analysis according to the second embodiment of the present invention;

BEST MODE FOR CARRYING OUT THE INVENTION

The following will explain embodiments in which the present invention is applied to the operation management system that detects the operation tendency of a vehicle and a fact of dangerous behavior to be presented to the driver.

(First Embodiment)

Figure 1:
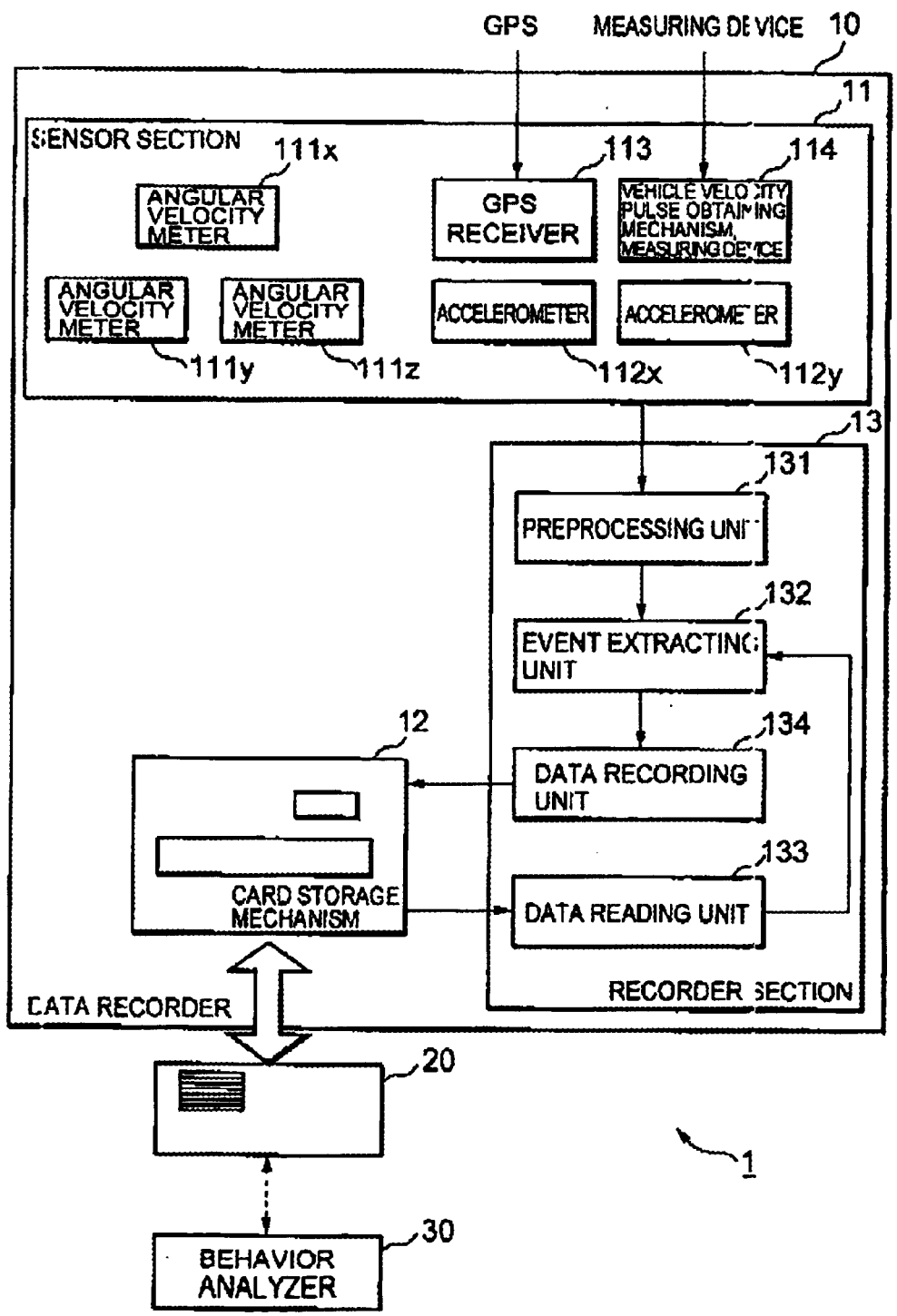
FIG. 1 is a structural view of an operation management system according to a first embodiment of the present invention.

FIG. 1 is a structural view of an operation management system according to a first embodiment of the present invention.

An operation management system 1 comprises a data recorder 10, a memory card 20, and a behavior analyzer 30. The data recorder 10 is attached to a given position of a vehicle. The memory card 20 records unique information of driver and condition patterns for recognizing the characteristic of vehicle behavior. The behavior analyzer 30 sets unique information and condition patterns to the memory card 20, reads information recorded on the memory card 20 based on these set information, and analyzes the content of vehicle behavior.

The data recorder 10 includes a sensor section 11, a card storage mechanism 12, and a recorder section 13.

The sensor section 11 has angular velocity meters 111$x$, 111$y$, and 111$z$ for detecting angular velocity data of three-dimensional axial direction (roll, pitch, and yaw) in the vehicle, accelerometers 112$x$ and 112$y$ for detecting acceleration data (accelerator acceleration, brake acceleration, cornering acceleration and like) in the back and fourth and right and left of the vehicle, and a GPS (Global Positioning System) receiver 113 for receiving GPS data indicative of current latitude, longitude, velocity and direction of the vehicle, and a pulse obtaining mechanism 114 for obtaining a vehicle velocity pulse from a vehicle instrument.

Among data output from the sensor section 11, accelerator acceleration is indicated by +○G (○ is hereinafter referred to numeric value, G is gravity acceleration), brake acceleration (back and fourth G) is indicated by −○G, right acceleration (lateral G) is indicated by left +○G, left acceleration (lateral G) is indicated by right −○G, and cornering angular velocity (Yr and like) is indicated by +○°/sec at the right side, and −○°/sec at the left side. Additionally, azimuth angular velocity (average) is indicated by ++○°.

In addition, GPS data and vehicle velocity pulse are configured such that they can be outputted selectively or together. For example, on the normal road where GPS data can be received, GPS data is used. In the tunnel where GPS data cannot be received, the velocity can be expressed using the vehicle velocity pulse and the current position can be corrected based on GPS data received so far.

The card storage mechanism 12 stores the memory card 20 detachably to support data reading and writing between the memory card 20 and the recorder section 13.

The recorder section 13 includes a CPU (Central Processing Unit) and a memory. In the recorder section 13, the CPU reads a given program recorded on a part of the memory to execute the program, whereby forming a function block of a preprocessing unit 131, an event extracting unit 132, a data reading unit 133, and a data recording unit 134 and a component having a counter function.

The preprocessing unit 131 performs removal processing of offset components and drift components included in angular velocity data outputted from the sensor section 11. The preprocessing unit 131 also performs matching between inertial data, which is composed of angular velocity data and acceleration data, and GPS data. Since GPS data lags about 2 sec behind inertial data, matching between GPS data and inertial data 2 sec before is performed.

The reading unit 133 recognizes the condition pattern recorded on the memory card 20, that is, vehicle characteristic behavior (behavior pattern) and transmits it to the event extracting unit 132. Particularly, the data reading unit 133 recognizes one threshold value or combinations of a plurality of threshold values, or behavior patterns such as curving at the intersection in order to recognize the fact (hereinafter referred to as "event") of dangerous behavior.

The event extracting unit 132 extracts measured data (angular velocity data, acceleration data, GPS data, vehicle pulse; hereinafter referred to as "event data") compatible with a condition pattern for each event from data, which is outputted from the sensor section 11 and which has no offset components and the like removed by the preprocessing unit 131. The event extracting unit 132 sends extracted event data, event kind data (condition pattern identification data), event occurrence time and date (GPS data), event occurrence location (GPS data), the number of records of the respective events (due to setting), distance traveled after occurrence of event, and initial information (recorder number, name of driver, vehicle number, and so on). Regarding the distance traveled, for example, distance after hard braking can be named. This distance can be obtained by counting the amount corresponding to the scale factor of a given vehicle pulse when the vehicle velocity pulse occurs by one pulse after hard braking. In the case where the vehicle velocity pulse cannot be obtained, the velocity can be detected based on the change in latitude and longitude included in GPS data, and the detected velocity is integrated so that the distance can be obtained.

In addition, the measured date is date that is obtained by adding 9 hours to worldwide standard time received by the GPS receiver 112, and measured time is time that is obtained by 9 hours to worldwide standard time received by the GPS 112. The event location is position information that can be specified by the latitude and longitude included in GPS data.

The data recording unit 134 converts data to file and records it on the memory card 20. Additionally, ignition ON/OFF, power ON/OFF of recorder 10, and occurrence time and the content of occurrence (what time, where, what occurs) when GPS communication normal/abnormal occurs are recorded in specific patterns.

Figure 2:
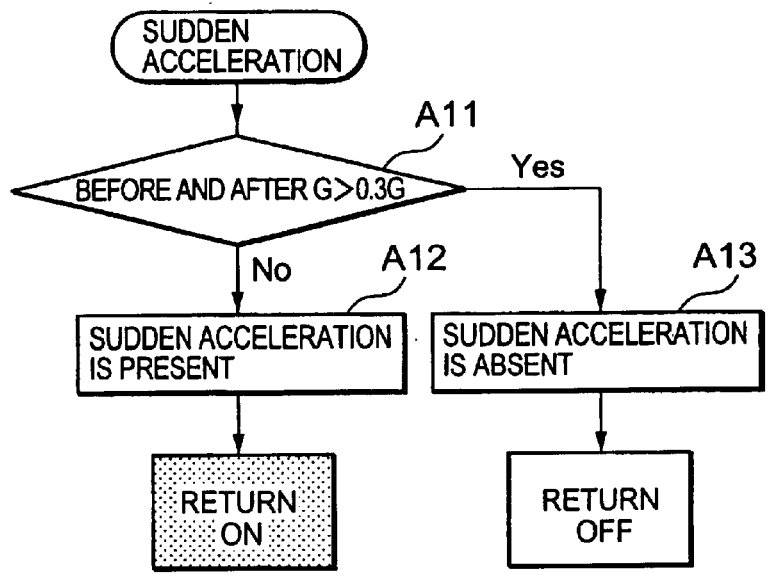
FIG. 2 is a view illustrating an example of a condition pattern in the case of sudden acceleration.
Figure 3:
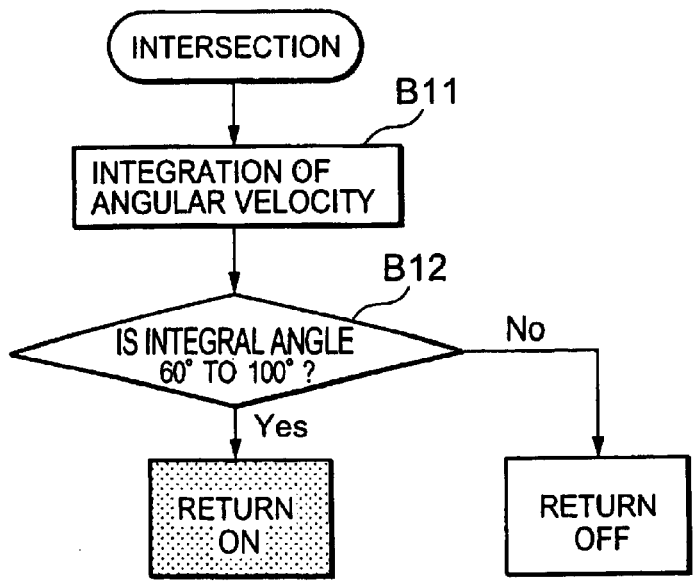
FIG. 3 is a view illustrating an example of a recognition condition pattern at an intersection.

FIGS. 2 and 3 show condition patterns for each event recognized by the event extracting unit 132. FIG. 2 shows the condition pattern of the sudden acceleration, FIG. 3 shows the condition pattern at the intersection, "return ON" denotes event recognition, and "return OFF" denotes event non-recognition, respectively.

It is noted that these condition patterns are only examples, and that they can be corrected ex post facto and additionally added.

The memory card 20 refers to nonvolatile memory such as transportable IC (Integrated Circuit) chip card having an EEPROM (Electrically Erasable and Programmable Read-Only Memory) and a ROM (Read-Only Memory), and a CPU or a flash ROM. ROM records a program code, and EEPROM records various kinds of setting information including the above-mentioned condition patterns, information relating to event data from the recorder section 13, and cipher information. In the case where the memory control function is implemented by the data recorder 10 and behavior analyzer 30, the memory control functions (CPU, ROM) are not necessarily prepared in the memory card 20.

Figure 4:
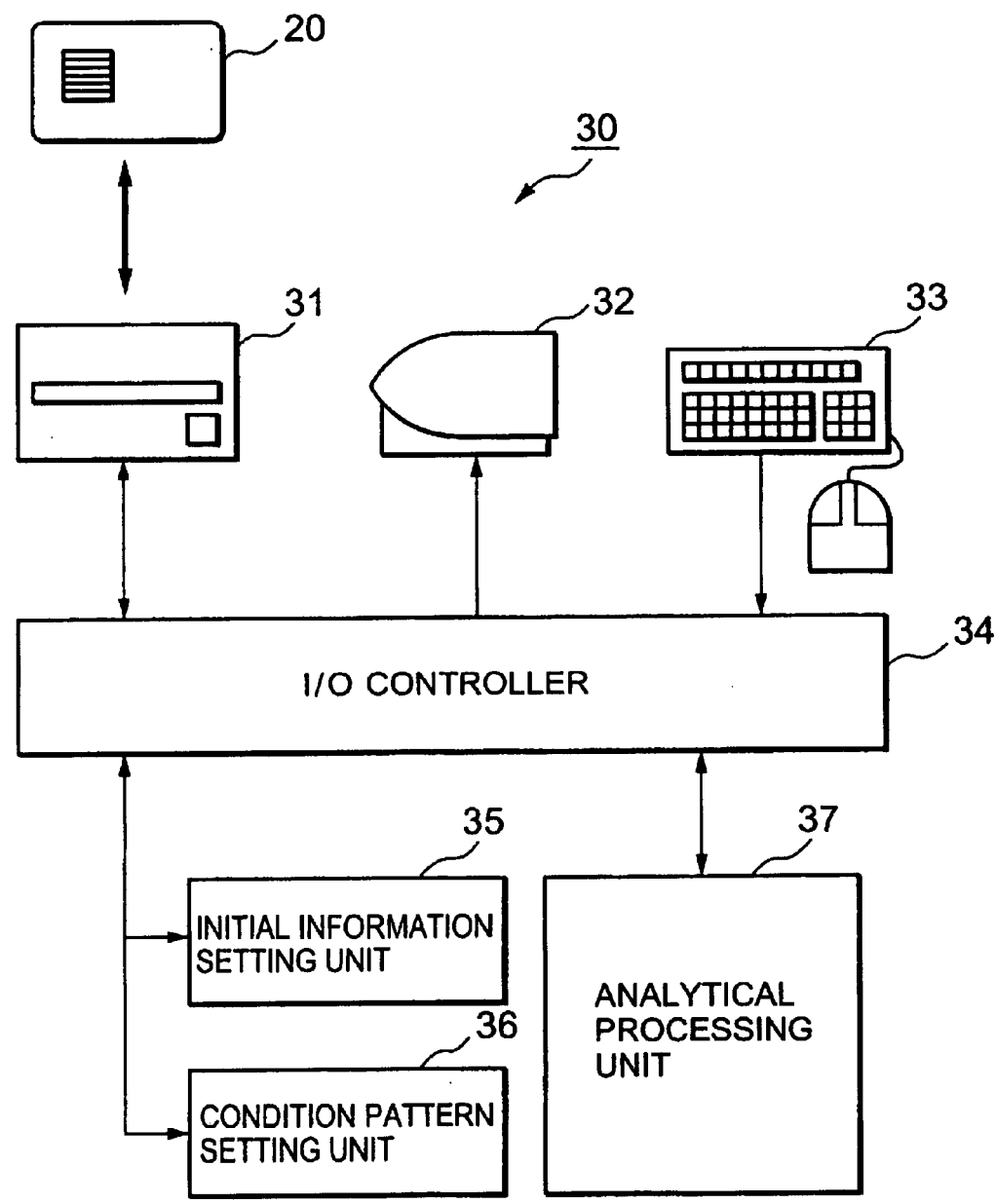
FIG. 4 is a structural view of a behavior analyzer according to the first embodiment.

The structural example of behavior analyzer 30 is illustrated in FIG. 4.

The behavior analyzer 30 illustrated in FIG. 4 is a stationary computer having a card reader/writer 31, a display unit 32, a data input unit 33, and an I/O controller 34. The card reader/writer 31 stores the memory card 20 and executes data recording/writing. The display unit 32 is used to confirm various kinds of setting information and the analytical result. The data input unit 33 is used to input initial information, the aforementioned condition patterns and the like. The I/O controller 34 performs an interface between these units.

Regarding an initial information setting unit 35, a condition setting unit 36, and an analytical processing unit 37 provided in the behavior analyzer 30, the CPU reads digital information recorded on a given storage medium and executes it with an operating system (OS) of the computer (cooperative execution), whereby implementing the functions of the respective components.

The initial information setting unit 35 sets individual information, information of data recorder 10, and information of the vehicle on which the data recorder 10 is mounted to the memory card 20 when the memory card 20 is used for the first time. Individual information refers to a name of driver who possesses the memory card 20. Information of data recorder 10 refers to a recorder number for identifying the data recorder 10 and a lot number of data recorder 10. Information of the vehicle refers to a vehicle number of the vehicle to which the data recorder 10 is attached, a vehicle model, a vehicle velocity pulse, a scale factor of the vehicle velocity pulse, and so on.

The above initial information is used to identify an analyzing vehicle and a driver, who drives the vehicle, and to improve accuracy of data recorder 10 in the behavior analysis.

The condition setting unit 36 sets various kinds of condition patterns onto the memory card 20. The condition setting unit 36 and initial information setting unit 35 put some schemes to facilitate driver convenience. For example, a setting interface screen page having a given filling typed dialogue window is displayed on the display unit 32, so that the driver can fill corresponding data in the corresponding area of the dialogue window using the data input unit 33. This makes it possible to set various kinds of setting information.

The analytical processing unit 37 analyzes the content of the vehicle behavior and the driver's operation tendency (habit, etc.) from event data recorded on the memory card 20. More specifically, the analytical processing unit 37 reads event data recorded on the memory card 20 and information relating thereto in operation unit, for example, on a day-to-day basis and summarizes information to perform graph processing with respect to summarized information. This makes it possible to display time and date of occurrence of each event, location of occurrence, tendency of occurrence in operation unit, and frequency of occurrence on the display unit 32 and to obtain visual understanding.

At the time of analysis, items are displayed on a hierarchical menu page in which processible items are associated with each other by the corresponding subroutine, and an item that the driver wishes is selected, so that information processing, which is based on event data, is automatically initiated and executed.

On the menu page, for example, an item relating to initial information is first displayed. A page for selecting who drives the vehicle and which vehicle is driven, a page for selecting an item of performing analytical processing, and a detailed selection page are sequentially displayed. The selection page includes items such as the number of occurrences of dangerous behavior or characteristic behavior/bad habit information/operation path/drive estimation graph display and the like. The detailed selection page includes selective items such as sudden acceleration and the like in the case of dangerous behavior.

The processed results of the items selected by the driver are sequentially displayed on the display unit 32, and recorded on the file as required. Or, they may be printed by a printer (not shown). Additionally, the function of data conversion may be provided to the analyzer 30 so that statistical processing is executed using the existing spreadsheet software or database software and like.

An explanation is next given of the operation mode in the above-structured operation management system 1.

Preparation of Memory Card 20

In the case of a new driver, a memory card 20 for the driver is generated. In this case, the driver attaches the new memory card to the card reader/writer 31, and causes the display unit 32 to display initial information setting page illustrated in FIG. 5, and inputs corresponding data thereto using the data input unit 23. Next, the driver causes the display unit 32 to display the characteristic setting page illustrated in FIG. 6 and inputs predetermined data therein. The set data is recorded on the memory card 20. Even in the case where the driver is not the new driver, the threshold value and detailed conditions are changed and the content is newly set by the behavior analyzer 30.

Recording of Event Data by Data Recorder 10

The memory card 20 is attached to the card storage mechanism 12 of the data recorder 10 fixed to the vehicle, and the driving is started. When the vehicle is started to move, the sensor 11 of the data recorder 10 measures the behavior sequentially, and sends the output data to the recorder section 13. The recorder section 13 extracts only event data compatible with the condition pattern set as mentioned above and information relating thereto, and records them on the memory card 20.

(3) Analysis of Event Data and Like

Figure 7:
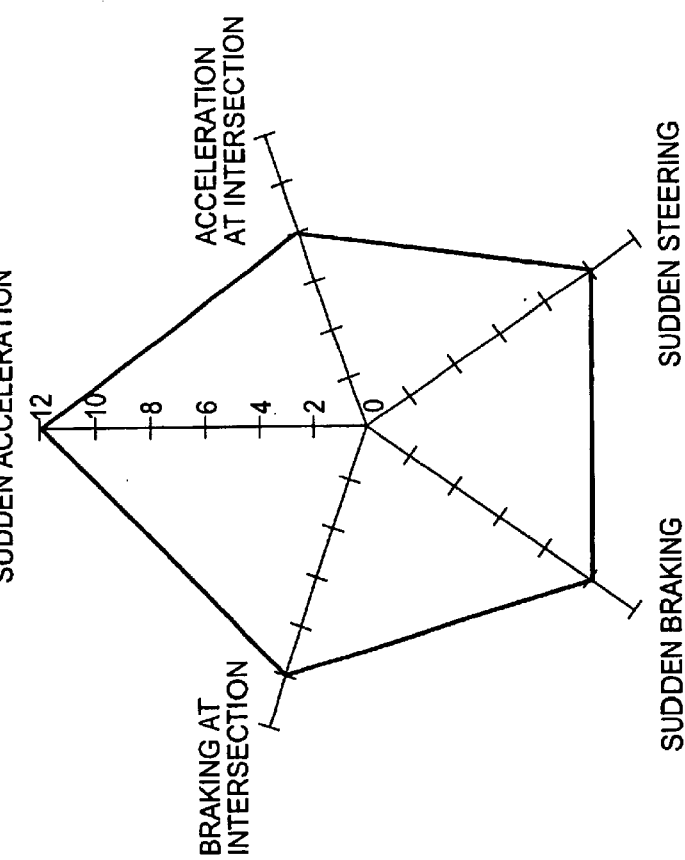
FIG. 7 is a graph showing one example of an analytical processing result.

After the end of driving, when the memory card 20 detached from the data recorder 10 is inserted into the card reader/writer 31 of the behavior analyzer 30, the menu page of analytical processing is displayed on the display unit 32. When the driver selects a specific processing item through the menu page, the corresponding subroutine is automatically started, information read from the memory card 20 is subjected to classification processing, statistical processing, display processing and the like. Regarding the display processing, the analytical result including the driver estimation graph as illustrated in FIG. 7 is displayed on the display unit 32.

Thus, according to the operation management system 1 of this embodiment, initial information and condition pattern are set onto the memory card 20 for each driver. When an event compatible with the condition pattern occurs, only information relating to the event is recorded on the memory card 20. This makes it possible to analyze the drive estimation and the operation tendency for each driver as improving the effective use of resource.

For this reason, regardless of the occurrence of accident, it is possible to recognize the mode of use without being limited to only the case where the accident occurs unlike the conventional case. For example, this makes it possible to confirm the process of improvement in technique for safe driving and the characteristic behavior and to prevent accidents from being generated.

(Second Embodiment)

The first embodiment showed the example in which the data recorder 10 determined whether or not output data sent from the sensor section 11 was compatible with the condition pattern set by the driver, and compatible invent data and information relating thereto were recorded on the memory card 20. However, the condition pattern is not always provided onto the memory card 20. For example, the function block corresponding to the event extracting unit 132 of the first embodiment may be provided to the behavior analyzer 30 such that event data, which is compatible with the condition pattern at the input stage of the behavior analyzer, and only information relating thereto are sent to the analytical processing unit 37.

In this case, since only various kinds of threshold data for recognizing the event and data collecting interval may be set, the structure is simplified. Moreover, data recorded on the existing safety recorder can be analyzed, making it possible to structure the operation management system with high general versatility.

(Third Embodiment)

An explanation is next given of the third embodiment.

Figure 8A:
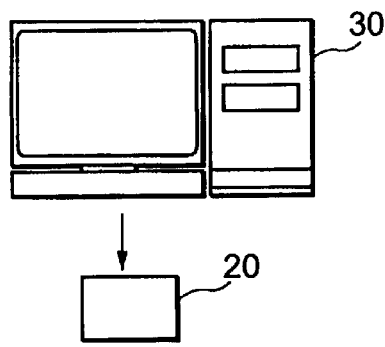
FIG. 8A is a schematic view illustrating a state in which collecting condition for collecting measured data is set onto a memory card 20 in a behavior analyzer 30 according to the operation management system of a second embodiment of the present invention.

According to the third embodiment, as illustrated in FIG. 8A, in the behavior analyzer 30, a data collecting condition for collecting information of specific behavior of a mobile object is set onto the memory card 20.

Figure 8B:
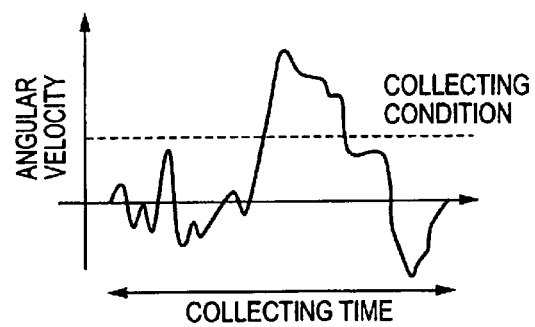
FIG. 8B is a graph showing an example in which behavior that satisfies the collecting condition is detected to collect measured data according to the second embodiment of the present invention.

For example, as a data collecting condition, there can be named a case in which the angular velocity that changes for one second exceeds 10° as illustrated in FIG. 8B. When such a condition is satisfied, it is determined that the specific behavior occurs, and measured data for given time before and after occurrence (for example, 30 seconds before and after) is recorded on the memory card 20.

For example, a collecting condition is set onto the memory card 20 in order to collect measured data of a pattern of making a turn at a curve (specific behavior). More specifically, when a case in which a turn is made with curve driving at more than 20°/sec is set as a collecting condition, measured data with respect to the behavior that satisfies this condition (behavior exceeding a set value) is collected using a high-frequency signal (for example, 10 Hz). Regarding measured data collected, the driver's operation tendency of mobile object is analyzed using an analytical method to be described later.

As timing for determining the occurrence of the specific behavior as an analytical target, the following can be named:

when the vehicle pulls away the stop position;
  (b) when curve driving occurs at the intersection;
  (c) when the vehicle passes through a specific point; and
  (d) when angular velocity, acceleration, and velocity, which are more than a predetermined threshold value. The condition is set to collect measured data during only a fixed time period before and after the above timing. The condition may be set to collect measured data only for time when the predetermined condition is satisfied without limiting to the fixed time period.

In the first embodiment, the condition patterns for recognizing danger were stored in the form of the condition steps as illustrated in FIGS. 2 and 3. However, the condition pattern is not always stored in such form. The third embodiment set forth below uses a form in which a condition pattern obtained from two-dimensional measurement is modeled.

According to this embodiment, in performing measurement and analysis, emphasis is laid on the driving tendency at the location where two complex operations having 1) operations of accelerator and brake and 2) the operation of steering wheel are needed in driving operation. In other words, measured data is collected based on the collecting condition which is the complex conditions set according to the plurality of different mobile operation factors, and the analysis of behavior is performed based on information set according to the similar operation factors.

This embodiment will explain a right turn at the intersection as a location where the complex operations are needed. It is noted that the aforementioned two complex operations are measured by an accelerometer and an azimuth gyroscope, and measured data is outputted from the respective devices.

Figure 9:
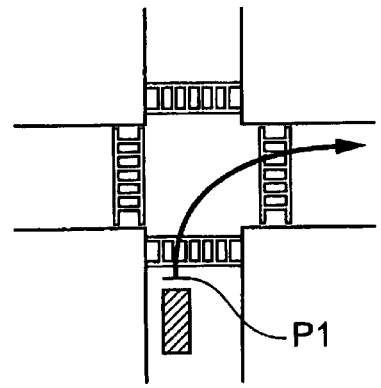
FIG. 9 is a view illustrating a state in which a vehicle turns right at an intersection.
Figure 10A:
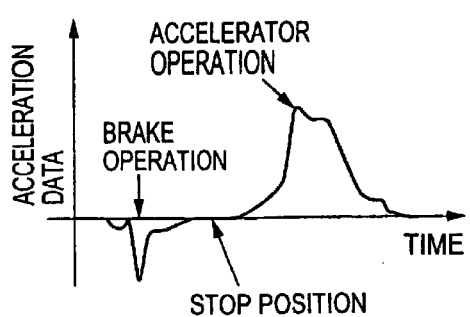
FIG. 10A is a graph showing output data from an accelerometer in connection with a right turn operation when unreasonable driving behavior does not occur.
Figure 10B:
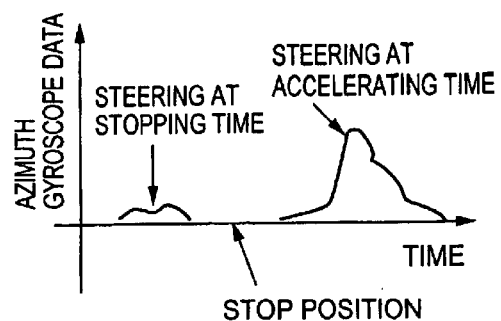
FIG. 10B is a graph showing output data from an azimuth gyroscope in connection with a right turn operation when unreasonable driving behavior does not occur.
Figure 11:
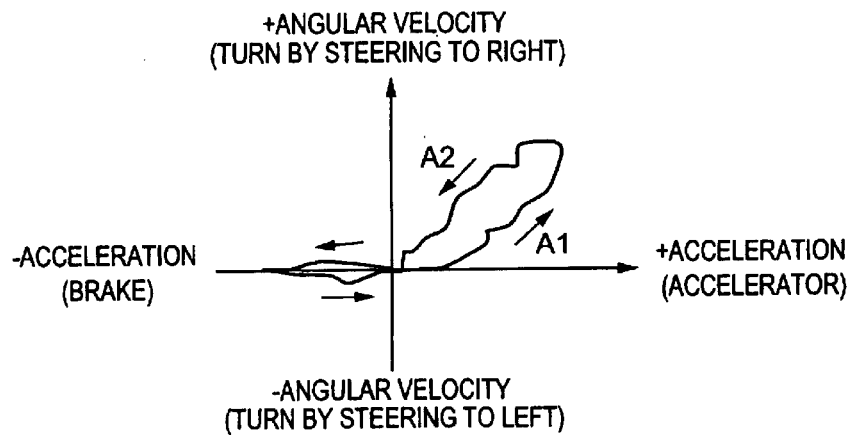
FIG. 11 is a graph in which the graph of FIG. 10A and that of FIG. 10B are combined.

FIG. 9 illustrates the outline of the intersection and the direction where the vehicle, which is operated by the driver, moves. A temporarily stop position P1 is provided at this intersection. When the driver operates the vehicle to be moved in the direction illustrated in FIG. 9, there is a case in which unreasonable driving behavior, which is generated by the operation to avoid danger caused by a hasty driving or careless driving when attention is paid to pedestrians and oncoming vehicles, is measured. Graphs illustrated in FIGS. 10A and 10B show output data from the accelerometer in connection with the right turn operation when unreasonable driving behavior does not occur, and output data from an azimuth gyroscope in connection with the right turn operation when unreasonable driving behavior does not occur, respectively. As is obvious from these graphs, acceleration data measured by the accelerometer and angular velocity data of the turn measured by the azimuth gyroscope show the characteristics of the right turn operation performed by the driver. FIG. 11 illustrates the combination of these graphs.

Data Illustrated in FIG. 11 Shows the Following Behavior.

First, it is shown that angular velocity is generated by steering to the right slightly as applying the brakes that generate acceleration in the minus direction. After the temporary stop, the accelerator pedal is pressed down as steering to the right, whereby generating acceleration in the plus direction (arrow A1). Moreover, it is shown that the steering wheel is returned to the original state as reducing acceleration after reaching the given velocity (arrow A2).

Figure 12A:
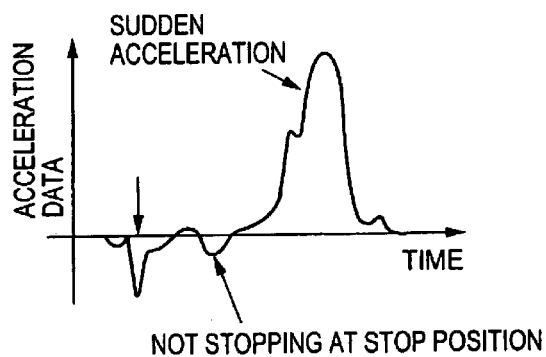
FIG. 12A is a graph showing output data from the accelerometer when unreasonable cornering is performed to turn right.
Figure 12B:
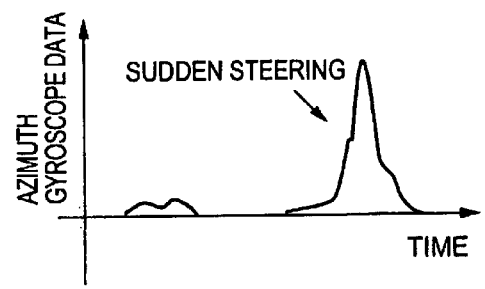
FIG. 12B is a graph showing output data from the azimuth gyroscope when unreasonable cornering is performed to turn right.

Data illustrated in FIGS. 10A, 10B, and 11 are graphs when unreasonable driving behavior does not occur. On the other hand, FIGS. 12A, 12B and 13 (solid line) show data of the case in which the vehicle turns to the right unreasonably since the oncoming vehicle is approaching from the front at the time of the right turn operation. It is clear from data shown in these graphs that the vehicle is not completely stopped at the stop position and that the sudden acceleration and sudden steering operation are performed. FIG. 14 is a table showing a comparison between the case (normal curve operation) in which unreasonable driving behavior does not occur at the time of the right turn operation and the case (abnormal curve operation) in which unreasonable driving behavior occurs using a plurality of items.

Figure 13:
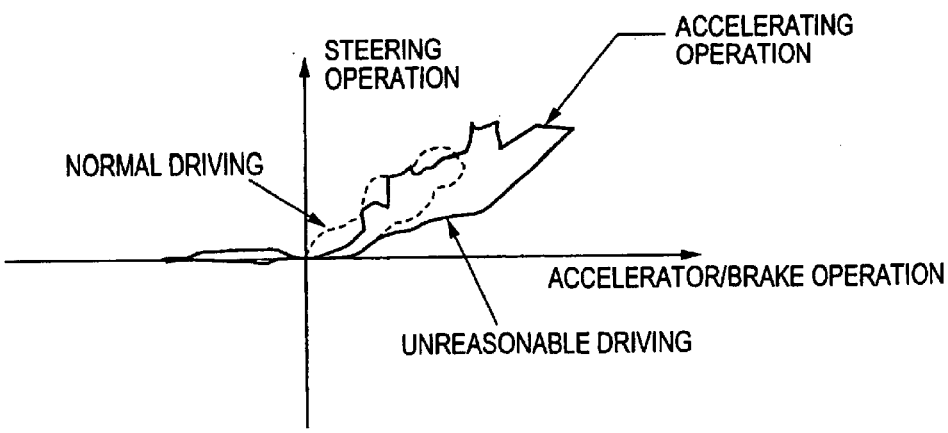
FIG. 13 is a view showing a graph (solid line) where

Thus, regarding the behavior (complex behavior) caused by the plurality of different operations, the measuring results of the respective operations are processed in multi-dimensions, whereby making it possible to clearly differentiate between the normal driving behavior and the abnormal driving behavior. For example, if the graph showing the normal driving behavior at the time of the right turn and the graph showing the abnormal driving behavior are combined, the graph is given as illustrated in FIG. 13. It is understood from the figure that the graph showing the abnormal driving behavior (solid line) indicates an increase curve in the acceleration at a starting time is sharp and that no smoothness is found in the entire shape as compared with the graph showing the normal driving behavior (broken line). Thus, it is possible to easily estimate the driving behavior from the difference in the shape of graph where the pattern recognition and the pattern matching are performed.

If the graph in the case of turning after sudden acceleration is schematically shown, it is indicated by L1 of FIG. 15. Also, if the graph in the case of sudden acceleration after hard cornering is schematically shown, it is indicated by L2 of FIG. 15. As is obvious from these graphs, the inclination of the rise of the graph becomes small in the case of turning after sudden acceleration and becomes large in the case of sudden acceleration after hard cornering.

The normal driving behavior at the time of the right turn is to steer the wheel as accelerating the velocity, and if this behavior is illustrated by the schematic graph, it is shown by L3 of FIG. 15. The respective graphs illustrated in this figure can be used as condition patterns in the second embodiment. Namely, in FIG. 16, blank areas show safe driving regions indicative of safe driving, and hatched areas other than the blank areas show dangerous behavior regions indicative of dangerous driving.

After providing the setting of such condition patterns and the data recording to the memory card 20, the behavior analyzer 30 analyzes the behavioral content of vehicle and the driver's operation tendency. In this case, it is possible to quantify the dangerous behavior and the characteristic behavior using a ratio of time for which the vehicle is out of the safe driving region. For example, among recorded data, it is assumed that time for which the vehicle is positioned at the safe driving region or dangerous behavior region is 3.56 sec, and time for which the vehicle is out of the safe driving region is 2.34 sec. The equation, that is, degree of danger and degree of characteristic=2.34/3.56=0.66, is established. The use of thus quantified numeric value makes it possible to determine the driver's operation tendency and to compare with the content of other driver's behavior. In addition to such a calculation method, the area of the safe driving region may be converted to numbers.

In the above explanation, the intersection is taken as a location where complex operations are needed, and the analysis is performed from the acceleration and angular velocity measured by the accelerometer and the azimuth gyroscope. According to this, the behavior including the running patterns at the curve, the stopping patterns at the curve, start with turning, and stop with turning can be analyzed. The present invention is not limited to the above, and combinations of other measuring devices can be considered.

For example, it is possible to measure the acceleration and angular velocity using the vehicle velocity pulse and accelerometer as a measuring device. In this case, regarding even the acceleration (minus direction) that is generated by pressing down the brake, −0.1 G where the velocity of vehicle is 10 km and −0.1 G where the velocity of vehicle is 100 km are different from each other in the influence exerting upon the vehicle and driver. Accordingly, the analysis of measured data makes it possible to obtain the degree of danger according to the velocity even if the same braking operation is performed.

Moreover, in addition to the velocity and angular velocity, it is possible to measure acceleration in the lateral direction of the vehicle (lateral acceleration) using the azimuth gyroscope and the accelerometer as the measuring device. In this case, centrifugal force can be obtained from the product of the velocity and angular velocity. In the normal driving, centrifugal force and the lateral acceleration are substantially equal to each other. However, the turn of vehicle exceeds the driving limit, the vehicle slides or a roll occurs, with the result that centrifugal force and the lateral acceleration are different from each other. Accordingly, it is possible to obtain the degree of danger based on the difference between centrifugal force and the lateral acceleration.

As explained above, according to the operation management system of the third embodiment, regarding the complex behavior at the location where complex operations are needed, the measuring results of the respective operations are processed in multi-dimensions. This makes it possible to specifically carry out the analysis of the degree of danger and the degree of characteristic and the determination thereof depending on the circumstances of behavior in addition to the technical advantages of the first and second embodiments.

Next, the method for setting the condition pattern will be more specifically explained.

The shape of the condition pattern of the third embodiment and the degree of danger to be analyzed differ depending on the environment where the vehicle is operated, that is, behavioral environment. The behavioral environment includes regions and districts where the vehicles are driving and a time zone.

Regarding the regions where the vehicles are driving, Tokyo and Hokkaido are different from each other in the average velocity of vehicle, the number of intersections, and so on. Even in the regions, the differences between the city and suburb, and between the long distance and short distance are generated depending on the regions. In addition, various conditions differ depending on the time zone including the driving in the nighttime, the driving in the early morning, and the driving in the evening. For this reason, the condition pattern may be set depending on the behavioral environment.

There is also an individual difference in the driving ability of driver. For this reason, a behavioral history such as statistics of the analytical results, and so on may be used if there is any. Namely, the numeric value and the condition pattern are changed based on the driving ability and the accident history. This makes each analytical result different even if the driver operates the vehicle in the same way.

The aforementioned data analysis is carried out after the behavior analyzer 30 reads data from the memory card 20. The collection of measured data and the analysis are repeated based on the aforementioned setting of the collecting conditions, whereby making it possible to collect the driving patterns as a target and to convert the driving tendency to numbers as well as the detection of dangerous behavior. Moreover, the collecting condition may be set onto the memory card 20 based on the analyzed driving tendency.

Moreover, various applications may be possible by combining the collection condition and the aforementioned behavioral environment or behavioral history. For example, it is assumed that the long-distance truck drivers using an expressway are used as a target driver to detect the operations of the accelerator and brake. The velocity is 70 km/h or more and 0.1 G or more as collecting conditions, and measured data can be collected and analyzed. In the same target driver, such a collecting condition that collects differential values of angular velocity is set in order to recognize the sudden wheeling operation even if the numeric value is small. This makes it possible to take prevention measures against drive dozing (Modifications)

An explanation is next given of the modification of each embodiment.

It is assumed that the operation management system collects the measured data for 30 seconds before and after the behavior that corresponds to the collecting condition is generated and collects statistical data every one minute when the behavior does not correspond to the collecting condition. Then, an example of the collection and analysis of the statistical data collected for one minute is explained. Regarding the method for collecting statistical data for 30 seconds before and after, various kinds of methods can be considered. Among these, as the easiest method, there is a method in which measured data is endlessly recorded on nonvolatile memory with a capacity that can record measured data for more than at least one minute, and the recording of measured data is stopped 30 seconds later after an event occurs. Whether the event occurs or not can be easily understood by detecting abrupt data of angular velocity and acceleration or combinations of the specific data groups.

Figure 19:
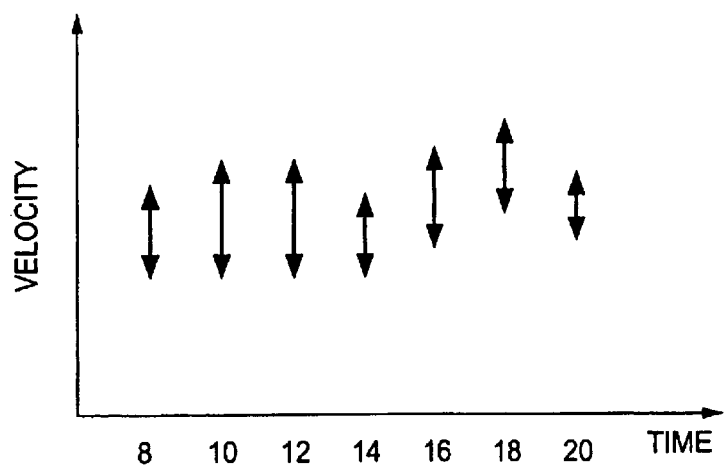
FIG. 19 is an example of the analytical result of data collected according to a modification of the present invention, namely a view illustrating independence of maximum velocity on time obtained by performing one-month statistical processing on the analysis of the maximum velocity of FIG. 18 for one month.

The schematic structure of data collected in this modification is illustrated in FIG. 16, and the content of statistical data for one minute is illustrated in FIG. 17. The specific content of analytical processing of the statistical data content illustrated in FIG. 17 is explained as follows:

As an analytical example of the maximum velocity for one day, an example illustrated in FIG. 18 can be taken. FIG. 18 is a view showing the history of the maximum velocity every one minute. One-month statistical processing of such data is performed, so that statistical graph as illustrated in FIG. 19 can be obtained and the relationship between the velocity and the time zone can be deduced from the distribution of this statistical graph. For example, it is possible to seek the cause that the velocity changes depending on the time zone. Normally, the velocity increases in the evening and the standard deviation 1 σ of velocity becomes large. This indicates that variations in velocity become large. The degree of danger and a numeric value to be noticed can be obtained from the value of velocity itself and "the amount of deviation" from the statistical numeric value (e.g., average value) of the standard deviation or the statistical numeric value of safe driving.

Figure 20:
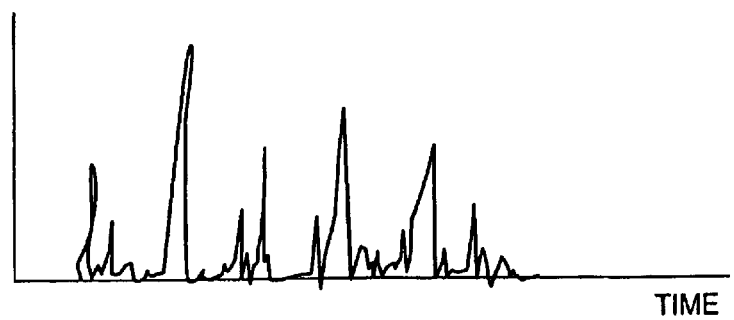
FIG. 20 is an example of the analytical result of data collected according to a modification of the present invention, namely a view illustrating the history of the maximum acceleration for one day.

FIG. 20 illustrates the history of the maximum acceleration for one day. This makes it clear that the plus acceleration is acceleration using the accelerator and the minus acceleration is acceleration using the brake. This obtains the relationship between the accelerator and the brake in the time zone by the statistical processing using the average value and the standard deviation similar to the velocity. Then, the degree of reckless driving and the degree of danger can be obtained from "the amount of deviation" from the safe driving or the overall average.

Figure 21:
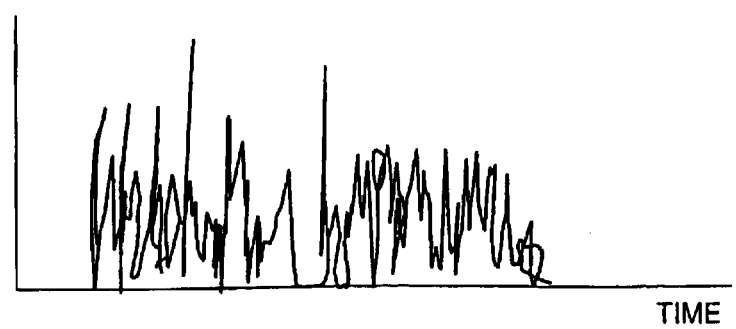
FIG. 21 is an example of the analytical result of data collected according to a modification of the present invention, namely a view illustrating the history of the maximum angular velocity for one day.

FIG. 21 illustrates the history of the maximum angular velocity for one day. This indicates that the steering to the right is plus and the steering to the left is minus. This makes it possible to specify the relationship between the steering operation and the time zone by the statistical processing using the average value and the standard deviation similar to the velocity. Then, the degree of reckless driving and the degree of danger are obtained from "the amount of deviation" from the statistical operation tendency such as the safe driving or the overall average.

The maximum lateral acceleration is subjected to analytical processing similar to the maximum acceleration and the maximum angular velocity, and the relationship among centrifugal force, roll angle, and time zone is specified. Then, the degree of reckless driving and the degree of danger are obtained from "the amount of deviation" from the statistical operation tendency such as the safe driving or the overall average.

Regarding the measurements of position and time using GPS, the history that indicates what time and where the vehicle is located every one minute is generated, whereby making it possible to confirm the operation start/end time as to how long the operation have been performed and to expand the operation position to a map with time to confirm an operation path. The vehicle velocity pulse, which is the measuring device, needs wiring work, but can estimate the driving velocity and distance using data of GPS.

In addition, the average and standard deviations of the maximum velocity, acceleration, and braking are subjected to statistical processing in accordance with various kinds of classifications, whereby obtaining the statistical results by driver, area, business office, and company. FIG. 22 illustrates an average maximum velocity for one month and a standard deviation (1 σ). Additionally, one-month statistics of specific time (e.g., 5 p.m.) is obtained, whereby allowing comparison about the time zone where the driver's careless driving and reckless driving easily occur. They are converted to numbers based on "the amount of deviation" from the statistical operation tendency such as the safe driving or the overall average, and the resultant can be used as materials for advice to be offered to the drivers.

Figure 24:
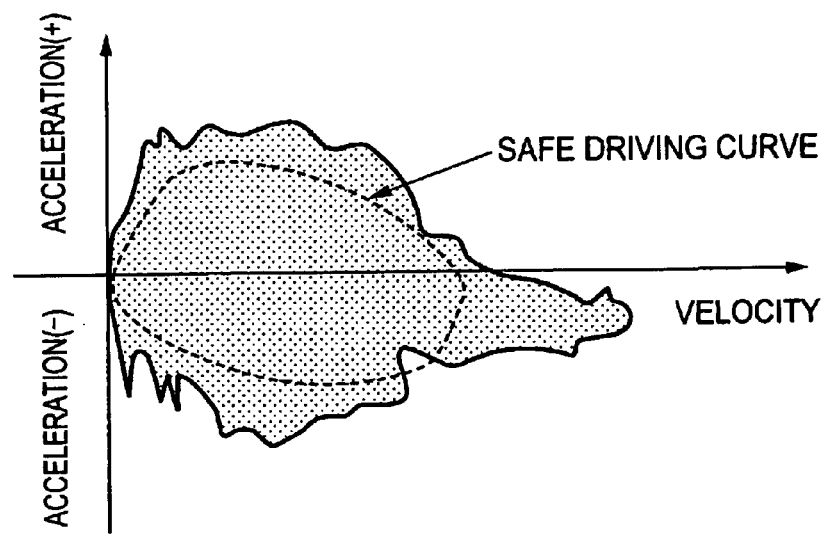
FIG. 24 is a view a graphic representation of the analytical result of "maximum acceleration-velocity" shown in FIG. 23.
Figure 25:
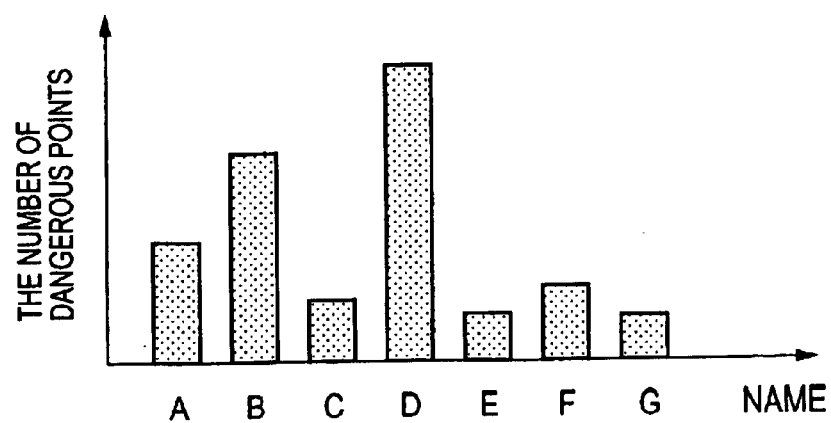
FIG. 25 is a view illustrating a resultant example in which degree of danger is analyzed by driver and individual based on data collected according to the modification of the present invention.

Moreover, the aforementioned items are combined, so that complex statistical analysis can be carried out. The combinations of measured data, measuring devices for use in measuring data and the contents of analysis are shown by a table of FIG. 23. Moreover, a graphic representation of the analytical result of "maximum acceleration-velocity" is shown by FIG. 24.

The analysis of "maximum acceleration-velocity" can determine and process the following points:

1) When the velocity is entirely increased, the valve of the braking and that of acceleration are decreased, and this makes it possible to determine that the braking at the high velocity is extremely dangerous behavior.

2) The increase of acceleration and that of the braking at low velocity depend on the operation at the time when the vehicle is started to move or stopped.

3) The safe driving curve is modeled, so that the dangerous behavioral analysis of the aforementioned data can be performed. Namely, the chain line illustrated in the same graph indicates the safe driving area, and the degree of danger can be obtained from this distribution. The following equation can be taken as a calculation example.

Degree of danger=the number of points other than the safe driving curve/the number of whole points=237/1034=0.23

In addition to the above, it is possible to analyze the driving tendency for each driver and individual.

According to the above modification, not only measured data of the dangerous behavior and the specific behavior but also measured data of the overall mobile operations can be collected and analyzed.

In this modification, measured data is recorded every one minute when the collecting condition is not satisfied. However, the present invention is not limited to such an example. Measured data may be recorded irregularly when the collecting condition is not satisfied.

Though the above embodiments have given the explanation on the assumption that one sensor section 11 composed of various kinds of measuring devices is installed at the specific location of the vehicle, the present invention is not limited to these embodiments. For example, a plurality of sensor sections 11 may be installed at the different locations of the vehicle. In the case where the plurality of sensor sections 11 may be installed at the different locations of one vehicle, a portion under a driver's seat, a rear seat, a trunk, and the like can be named as installing locations. The installment of sensor sections 11 at the plurality of locations is useful for the large-sized truck, bus, and railway car. In the case of truck, the behavior can be individually analyzed at the different locations including a driver's seat and a deck for freight. In the case of the bus and railway car, the behavior can be individually analyzed at the different locations including a driver's seat and passenger's seats.

At the time of installing the sensor sections 11 at the plurality of locations, the sensors 11 do not have to detect angular velocity data of three-dimensional axial direction, and each may have only an angular velocity meter that detects angular velocity data of a given direction. In this case, the behavior of the overall vehicle is analyzed using measured data sent from each sensor section 11, so that the tendency can be grasped. For this reason, this is suitable for analyzing the behavior by the manufacture that manufactures the vehicle.

Digital information (program code and data) for implementing the behavior analyzer of each embodiment on the computer is normally recorded on the fixed disc of the computer and read by the CPU of the computer and executed whenever necessary. However, if the aforementioned function blocks 35 to 37, and 132 are formed, the present invention can be carried out. For this reason, the recording mode, and the storage medium may be arbitrarily selected. For example, there may be used a transportable storage medium such as CD-ROM (Compact Disc-read-Only Memory), which is detachable from the computer, DVD (Digital Versatile Disc), optical disc, flexible disc, semiconductor memory, and so on, or a storage medium that is stored in a program server, which is connected to an in-house network, in a computer-readable form and that is installed to the fixed disc at the time of using.

In addition to the case in which the above function blocks 35 to 37 and 132 are formed by only digital information recorded on the storage medium, such a case is within the scope of the present invention where the part of digital information reads the function of OS to form the above function blocks 35 to 37 and 132.

Though the above-mentioned embodiments have explained the operation management of vehicle as an example, the present invention may be applied to the mobile objects other than the vehicle. For example, the present invention can be similarly applied to various kinds of mobile objects, e.g., a flying object such as a helicopter.

INDUSTRIAL APPLICABILITY

As is obvious from the above explanation, according to the present invention, the operation tendency of mobile object can be efficiently analyzed on an operator-by-operator basis.

What is claimed is:

1. An operation management system for a mobile object comprising:
   a data recorder including means for detecting behavior of a mobile object that satisfies a predetermined collecting condition and for recording the detected behavior before and after occurrence of said behavior on a predetermined storage medium when the behavior is detected;
   condition setting means for setting said collecting condition onto said storage medium such that said data recorder reads said collecting condition from said storage medium, said condition setting means being constructed to set said collecting condition in accordance with mobile object operation factors different from each other; and
   means for analyzing an operation tendency of the mobile object based on information recorded on said storage medium,
   wherein said data recorder records information relating to behavior compatible with said collecting condition set by said condition setting means on said storage medium according to the behavior.

2. The operation management system according to claim 1, wherein said data recorder further includes means for intermittently recording information relating to behavior that does not satisfy said collecting condition, and said data recorder records said information intermittently recorded on said storage medium as distinguished from information relating to behavior compatible with said collecting condition.

3. The operation management system according to claim 1, wherein said condition setting means sets said collecting condition in accordance with at least one of identification information of an operator of said mobile object, behavioral environment of said mobile object, and a behavioral history of said operator.

4. The operation management system according to claim 1, wherein said storage medium is in the form of a card that is classified in accordance with at least one of identification information of said mobile object, identification information of an operator that operates said mobile object, and behavioral environment of said mobile object, and that is generated on a classification-by-classification basis.

5. The operation management system according to claim 1, wherein said storage medium is a memory card detachably connected to said data recorder.

6. The operation management system according to claim 1, wherein said data recorder only information relating to behavior compatible with said collecting condition set by said condition setting means on said storage medium according to the behavior.

7. The operation management system according to claim 1, wherein said analyzing means are separate and apart from said data recorder.

8. An operation management system for a mobile object comprising:
   means for detecting whether behavior of a mobile object satisfies a predetermined collecting condition contained on a predetermined storage medium;
   means for recording the behavior of said mobile object on said storage medium when the behavior of said mobile object satisfies the predetermined collecting condition and for intermittently recording the behavior of said mobile object separate from the behavior of said mobile when the behavior of said mobile object satisfies the predetermined collecting condition on the predetermined storage medium when the behavior of said mobile object does not satisfy the predetermined collecting condition;
   means for analyzing an operation tendency of the mobile object based on information recorded on said storage medium; and
   means for reproducing operation circumstances of the corresponding mobile object based on each information recorded on said storage medium.

9. A data recorder comprising:
   a sensor section for detecting behavior of a mobile object as a time series; and
   recording means for determining the presence or absence of occurrence of a specific behavior in the behavior of the corresponding mobile object detected by said sensor section in accordance with a complex behavioral condition, which is a behavioral condition for determining said behavior as the specific behavior and which conforms to mobile object operation factors different from each other, and for recording information relating to the specific behavior of the corresponding mobile object in accordance with occurrence of said specific behavior on a predetermined storage medium to thereby enable analysis of an operation tendency of said mobile object based on information recorded on said storage medium.

10. The data recorder according to claim 9, wherein said specific behavior is dangerous behavior, and said recording means determines the presence or absence of occurrence of said dangerous behavior based on compatibility between a condition pattern that fixes the corresponding dangerous behavior and said behavior pattern detected by said sensor section, and said recording means records information of the corresponding behavior when said dangerous behavior occurs.

11. The data recorder according to claim 9, wherein said recording means intermittently records information relating to the behavior of the corresponding mobile object on said storage medium as distinguished from information relating to said specific behavior when no specific behavior occurs.

12. The data recorder according to claim 9, wherein said storage medium is in the form of a card that is classified in accordance with at least one of identification information of said mobile object, identification information of an operator of said mobile object, and behavioral environment of said mobile object, and that is generated on a classification-by-classification basis, and at least said behavioral condition is recorded on said card.

13. A behavior analyzer for a mobile object comprising: condition setting means for setting a complex collecting condition which is a collecting condition for collecting information relating to a specific behavior of the mobile object and which is based on mobile object operation factors different from each other on a predetermined storage medium; and analyzing means for reading recording information from said storage medium on which information relating to behavior of the mobile object compatible with said set collecting condition is recorded to analyze the behavioral content of the corresponding mobile object from said read information wherein said analyzing means reads information, which is different from information relating to said specific behavior and which is intermittently recorded according to behavior other than said specific behavior, from said storage medium, and analyzes the behavioral content of the corresponding mobile object in accordance with information.

14. A computer-readable storage medium having digital information recorded thereon, said digital information is causing a computer to execute procedures for:

setting a first collecting condition for collecting information relating to specific behavior of a mobile object and a second collecting condition for collecting information relating to normal behavior other than said specific behavior on a predetermined storage medium, wherein said specific behavior is dangerous behavior;

reading recorded information on behavior from said storage medium on which information relating to behavior compatible with said first and second collecting conditions is recorded as distinguished from each other; and analyzing the behavioral content of the corresponding mobile object from said read information.

15. An operation tendency analyzing method for a mobile object, comprising the steps of:

determining the presence or absence of an occurrence of specific behavior in behavior of the corresponding mobile object actually detected in accordance with behavioral conditions showing the specific behavior of the mobile object:

recording information relating to the specific behavior of the corresponding mobile object on a predetermined storage medium in accordance with occurrence of said specific behavior, and analyzing an operation tendency of the corresponding mobile object based on information recorded on said storage medium, wherein said recording step includes the step of recording information relating to said specific behavior before and after occurrence of the corresponding behavior on said storage medium as a time series and intermittently recording information relating to the behavior of said mobile object on said storage medium when no said specific behavior occurs, and said analyzing step includes the step of analyzing a complex operation tendency of the corresponding mobile object based on said recorded information.

16. An operation tendency analyzing method for a mobile object, comprising the steps of:

determining the presence or absence of an occurrence of specific behavior in behavior of the corresponding mobile object actually detected in accordance with behavioral conditions showing the specific behavior of the mobile object;

recording information relating to the specific behavior of the corresponding mobile object on a predetermined storage medium in accordance with occurrence of said specific behavior; and analyzing an operation tendency of the corresponding mobile object based on information recorded on said storage medium, wherein said analyzing step includes the step of obtaining a statistical operation tendency from information recorded on said storage medium intermittently, obtaining a difference between said statistical operation tendency and information recorded on said storage medium as a time series, and analyzing a complex operation tendency of the corresponding mobile object in accordance with said difference.

* * * * *